United States Patent [19]

Witney et al.

[11] 4,323,829
[45] Apr. 6, 1982

[54] CAPACITIVE SENSOR CONTROL SYSTEM

[75] Inventors: Gary Witney; Harry Visser, both of Thornhill, Canada

[73] Assignee: Barry M. Fish, Ontario, Canada

[21] Appl. No.: 172,529

[22] Filed: Jul. 28, 1980

[51] Int. Cl.³ ............................................. H02P 7/68
[52] U.S. Cl. ..................................... 318/55; 318/257; 318/341; 318/662; 318/599; 307/116; 340/365 C; 328/5
[58] Field of Search ................ 318/55, 257, 341, 662, 318/599; 307/116; 340/365 C; 324/60 C, 61 R; 328/5

[56] References Cited

U.S. PATENT DOCUMENTS

| | | | |
|---|---|---|---|
| 3,100,860 | 8/1963 | Rosenthal | 318/55 |
| 4,071,691 | 1/1978 | Pepper, Jr. | 340/365 C |
| 4,103,252 | 7/1978 | Bobick | 307/116 |

*Primary Examiner*—J. V. Truhe
*Assistant Examiner*—Eugene S. Indyk
*Attorney, Agent, or Firm*—Howard I. Schuldenfrei

[57] ABSTRACT

An electronic control system for controlling the operation of electromotive apparatus utilizes a capacitive sensor for sensing human touch and producing a command signal whose magnitude corresponds to the contact area of the contact. The sensor command signal is applied to an oscillator which produces a series of output width pulses having a frequency corresponding with the magnitude of the sensor command signal. A discriminator detects the trailing edge of the oscillator pulses and produces a series of fixed width pulses and an integrator produces a D.C. voltage signal corresponding to the discriminator output, which voltage signal corresponds to the area in proximity to and thereby stimulated by the human body. A comparator is employed to produce a pulse-width modulated rectangular pulse output whose duty cycle corresponds to the integrator D.C. voltage by comparing the integrator D.C. voltage with a reference triangular waveform. The comparator output is applied via power circuit to drive the electromotive apparatus which may typically comprise one or more D.C. electric motors.

14 Claims, 9 Drawing Figures

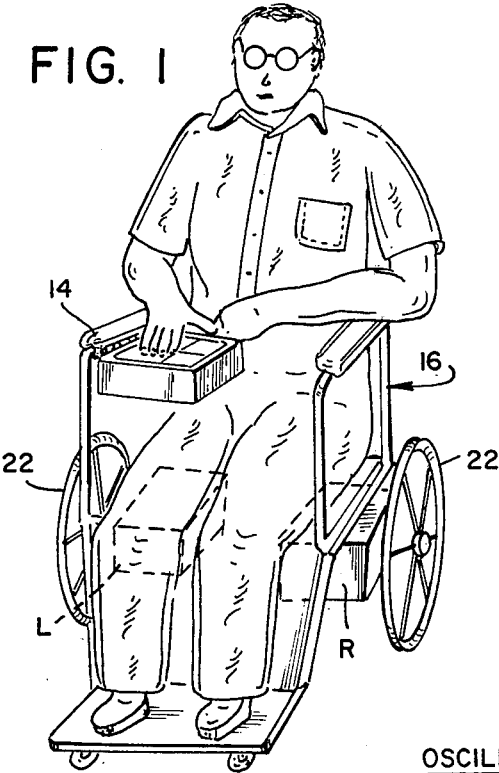
FIG. 1
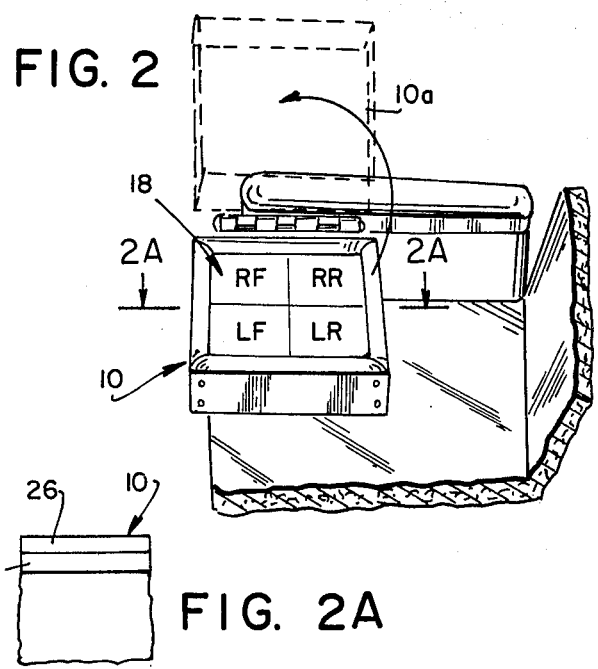
FIG. 2
FIG. 2A
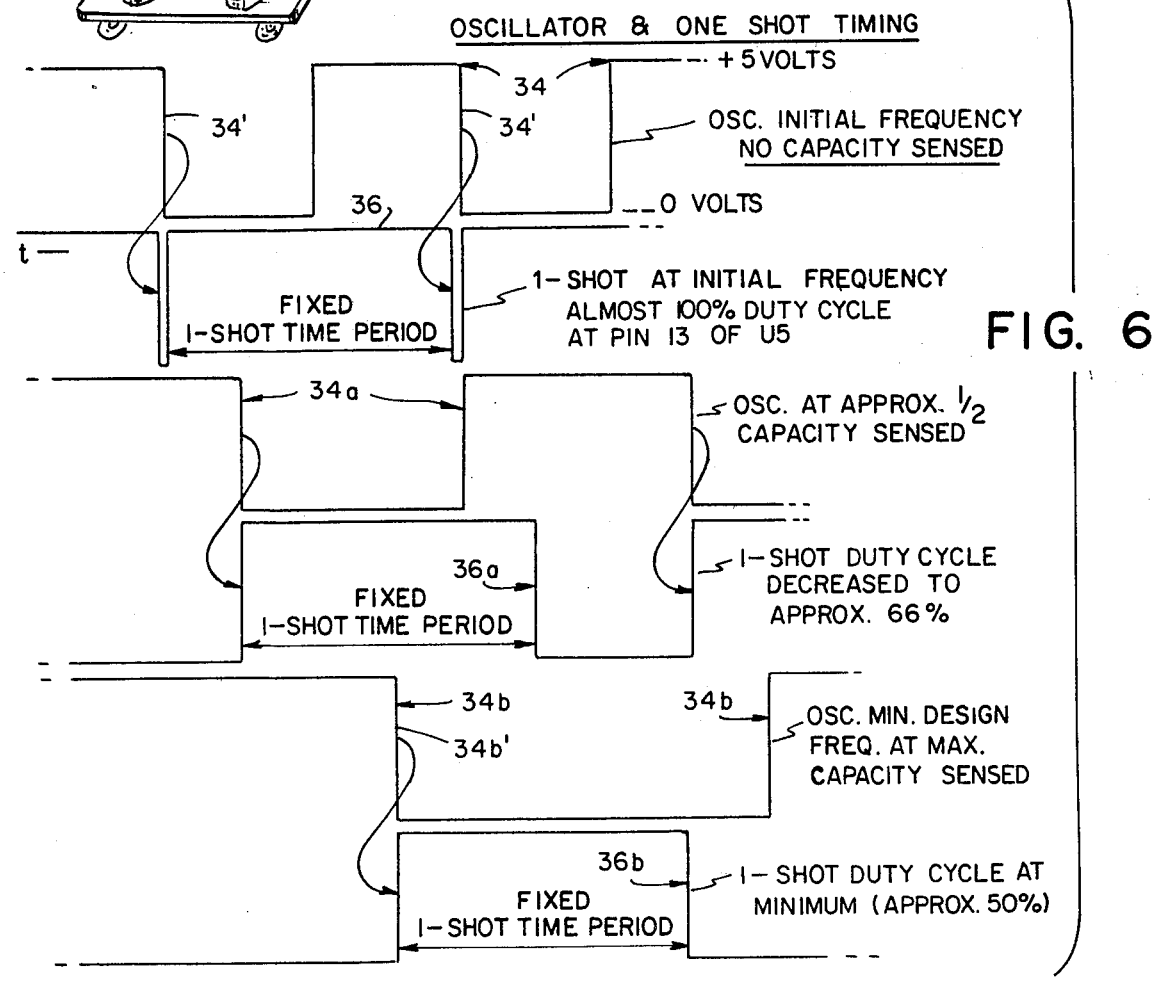
FIG. 6

CAPACITIVE SENSOR CONTROL SYSTEM

BACKGROUND OF THE INVENTION

This invention relates to motorized vehicle control systems and more particularly to an electronic control system especially suited for electrically powered wheelchairs for use by disabled persons with severely limited ability to manipulate the limbs, particularly the hands and digits.

It has been found that disabled persons suffering from poor coordination, inadequate muscle strength or limited movement of the arms, hands and fingers, conditions which typically result from the afflictions of muscular dystrophy and multiple sclerosis, are largely unable to exercise the necessary degree of control for existing electrically powered wheelchairs. Presently available electrically-powered wheelchairs typically employ for control purposes either "ON-OFF" switch controls, a control stick associated with a plurality of electrical switches, or a rather crude proportional control system. Each of these systems suffers from serious disadvantages to be presently described.

The "ON-OFF" switch control system which usually employs either a manually actuable push-button switch or a mercury switch mounted on a headband results in an erratic and jerking vehicular motion due to the sudden starting and stopping of the electric motor which powers the wheelchair. Moreover, a sudden start of the wheelchair in one direction will cause the rider's head and body to jerk in the reverse direction, which in turn creates a sharp false instruction to the motor to reverse direction. Such rapid forward and reversing motions of the wheelchair causes it to wheel around rapidly out of control of the rider. A high degree of coordination of the upper body and neck of the rider is required to avoid or minimize the aforementioned loss of vehicle control but most disabled wheelchair riders lack the required muscular control to overcome the just-described oscillatory motion of the vehicle. Where digitally actuated push-button switches are employed, severely disabled riders find it very difficult to accurately position their hands and fingers over the various push-buttons, usually four in number, and apply sufficient pressure thereto in order to achieve the desired vehicular motion. On the other hand, the push-buttons may easily be accidentally actuated by an inadvertent brush of the finger, causing unwanted vehicular motion.

In the switch and control stick system, at least four switches and a control stick are provided. In order to achieve forward vehicular motion the rider moves the control stick forwardly to actuate the two forward switches, which concurrently cause the electric drive motor to rotate each wheel at equal speed in the forward direction.

Movement of the control stick to the right will cause actuation of the left front switch, causing the motor to rotate the left wheel forwardly, and actuation of the right rear switch causing the motor to rotate the right wheel in reverse, thus causing the wheelchair to pivot to the right. Again, due to the "ON-OFF" nature of the four switches, sudden changes in vehicular motion result, particularly if the motor speed controls are set to the High Speed position, as is usually the case. Unfortunately, due to their muscular disabilities, many such persons confined to a wheelchair find themselves unable to exercise a sufficient degree of control over the vehicle. Even if the control stick is moved straight ahead, due to positional inaccuracies of the two forward switches they will not actuate perfectly simultaneously, whereby the wheelchair moves slightly to the left or right before moving forwardly. In addition, due to differences in friction or electrical wiring of the left and right drive motors, the wheelchair will tend to "wander" to the right or left requiring steering correction by the rider.

The use of switch controls imposes a severe reduction of battery life due to the fact that maximum power is always applied to the wheel drive motors on start-up even if the wheelchair is to be moved a short distance.

In presently available proportional control systems, which avoid some of the above-described problems in "ON-OFF" switching systems, the motor speed, i.e., wheel velocity is determined by the magnitude of the displacement of the control stick from its rest position. Motor speed control is achieved by varying the motor current by means of a variable resistor which is heavy, bulky and is very wasteful of battery-supplied electrical power due to the large amount of electrical power and resultant heat which must be dissipated. Where such motor speed control is accomplished by means of transistor or gate controlled rectifier switching circuitry, the required relays and other control circuitry greatly increases both the size and cost of the overall control system.

It is therefore an object of the present invention to provide an electronic control system for controlling electromotive apparatus which avoids the above-described deficiencies in existing control systems.

It is another object of the present invention to provide an electronic control system of the character described which is reliably operative in a severe mechanical and electrical environment.

It is a further object of the present invention to provide an electronic control system of the character described which is remotely operated by human touch.

It is yet another object of the present invention to provide an electronic control system of the character described which is particularly adapted for use by disabled persons in driving and steering a wheelchair.

SUMMARY OF THE INVENTION

In accordance with the present invention, there is provided an electronic control system for controlling the operation of electromotive means, such as an electric motor, comprising electrically capacitive sensing means for detecting proximity thereto of a portion of a human body, oscillator means operative to produce a series of output pulses having a frequency in accordance with the capacitance input thereto and discriminator means for detecting the trailing edges of said oscillator pulses and producing a series of fixed width pulses in response thereto. Also provided are integrator means operative to produce a D.C. voltage in accordance with said discriminator pulses, reference waveform generating means for producing a triangular reference waveform and comparator means operative to compare said integrator D.C. voltage and said triangular reference waveform and to produce a pulsed D.C. output having a pulse width determined by the difference between said compared D.C. voltage and said triangular waveform, and power circuit means for applying said pulsed D.C. output to said electromotive means.

Additional objects and advantages of the invention will become apparent during the course of the following specification when taken in connection with the accompanying drawings in which:

BRIEF DESCRIPTION OF THE DRAWINGS

FIG. 1 is an overall perspective view of a wheelchair having a pair of wheel drive electric motors and provided with the electronic control system of the present invention mounted in a control box;

FIG. 2 is a fragmentary view of the electronic control box of the present invention shown mounted on a wheelchair;

FIG. 2A is an enlarged elevational section view of the sensor plate of the electronic control box of FIG. 2;

FIG. 6 is a waveform diagram showing the voltage output waveforms of oscillator U3 and the one-shot circuit U5 of FIG. 3;

DETAILED DESCRIPTION OF THE INVENTION

Figure 3:
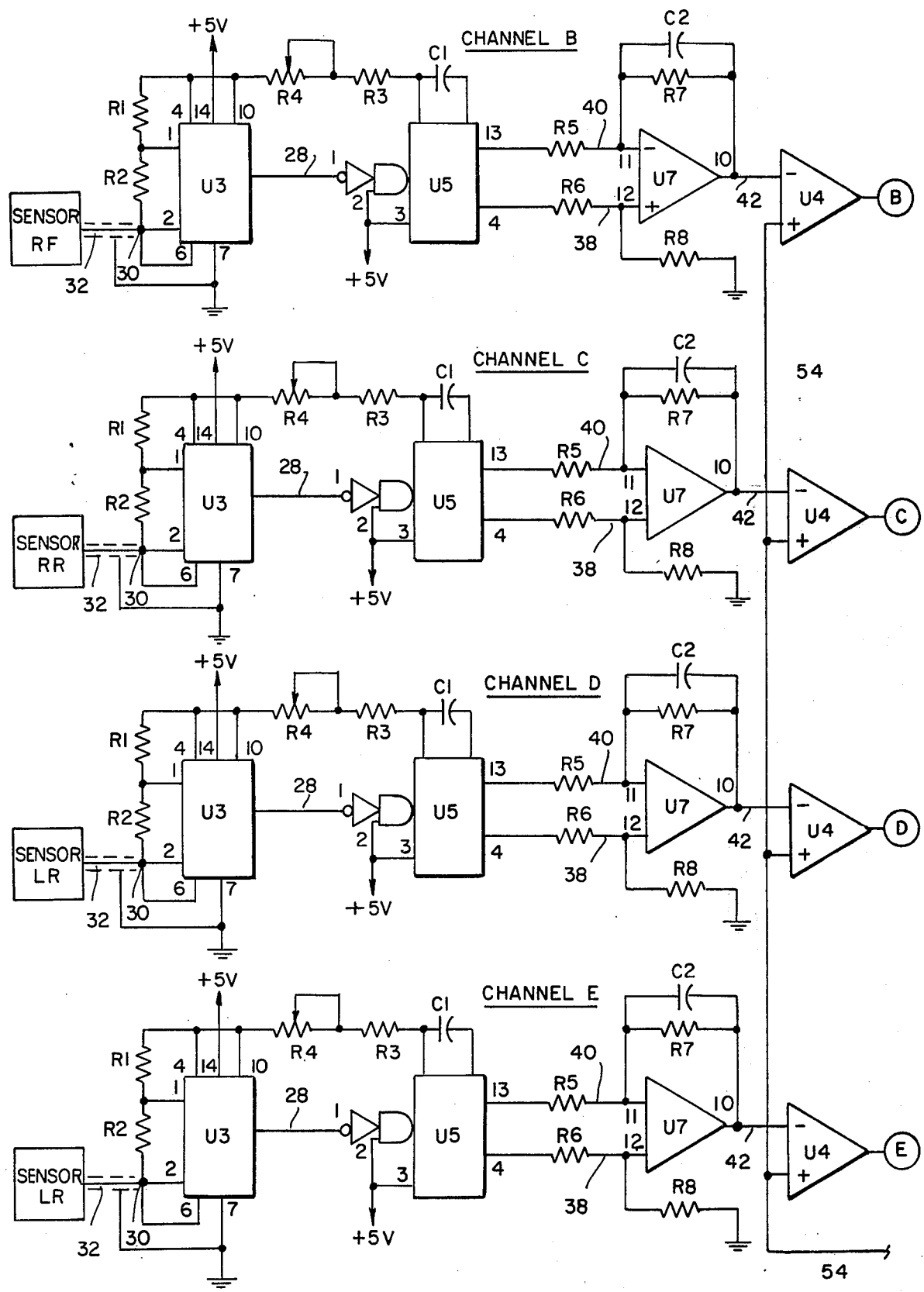
FIG. 3 is an electrical schematic diagram of a portion of the electronic control system of the present invention showing channels B, C, D and E.

With reference to the drawings, there is shown in FIG. 1 a control box 10 housing the control system of the present invention, hingedly mounted along one edge thereof to the upper bar 12 mounting one of the arm rests 14 of the wheelchair 16. As shown in FIG. 2, control box 10 is pivotable from a vertical inoperative position represented by dotted outline 10a or to a horizontal operative position shown in solid outline 10 in FIGS. 1 and 2.

Mounted at the upper surface of control box 10 is a sensor surface 18 divided into four quadrant sensor areas RF, LF, RR and LR corresponding to Right-Forward, Left-Forward, Right-Rear and Left-Rear travel directions respectively as shown in FIG. 2. Thus, for example, if the user wishes to cause the chair to travel forwardly in the right direction he would touch the RF sensor area, and if he wishes to travel in the left-rear direction he would touch the LR sensor area, and so forth. If he desires to travel in the straight ahead or straight rearward direction he would touch both RF and LF sensors simultaneously, respectively. The magnitude of the areas touched in any one of the four sensors RF, LF, RR or LR respectively determines the magnitude of the velocity vector for the particular direction corresponding to the sensor being stimulated. Thus, the user can control the degree of steering to the left or right directions by correspondingly varying the area being stimulated in the left quadrant sensors LF or LR and right quadrant sensors RF or RR respectively. By varying the exposure applied to the sensor quadrants by the palm and/or fingers of the hand, for example, and hence the area being stimulated in a particular sensor area, the user may achieve fine speed control in the desired direction. It should be noted, however, that the sensor areas RF, RR, LF and LR respectively are responsive only to changes in stimulated area rather than directly to contact pressure. Sensing areas RF, RR, LF and LR may assume virtually any geometrical shape which is appropriate for the particular application, such as cylindrical, flat or spherical shapes. The sensors may be connected to the remaining control circuitry by means of subminiature coaxial cables, and may, therefore, be mounted at any convenient location remote from the remaining control circuitry.

In the case of a wheelchair application, the sensing surface is usually flat and has a two-dimensional configuration which is determined by the user's requirements. Thus, although sensing areas RF, RR, LF and LR are shown as squares in FIG. 2, in the case of a user with poor coordination these sensing areas may advantageously assume the shape of a Maltese Cross. In such configuration, maximum forward and reverse functions could be achieved as easily as with square sensor areas, but it would be difficult to switch from forward to a fast reverse direction, for example. Any desired geometrical configuration for the sensing areas could be achieved merely by placing a mask having the desired sensing area geometry over the sensors.

The structure and operation of the electronic circuitry which comprises the proportional control system of the present invention which achieves the above-described wheelchair travel control wall now be described in detail.

Figure 4:
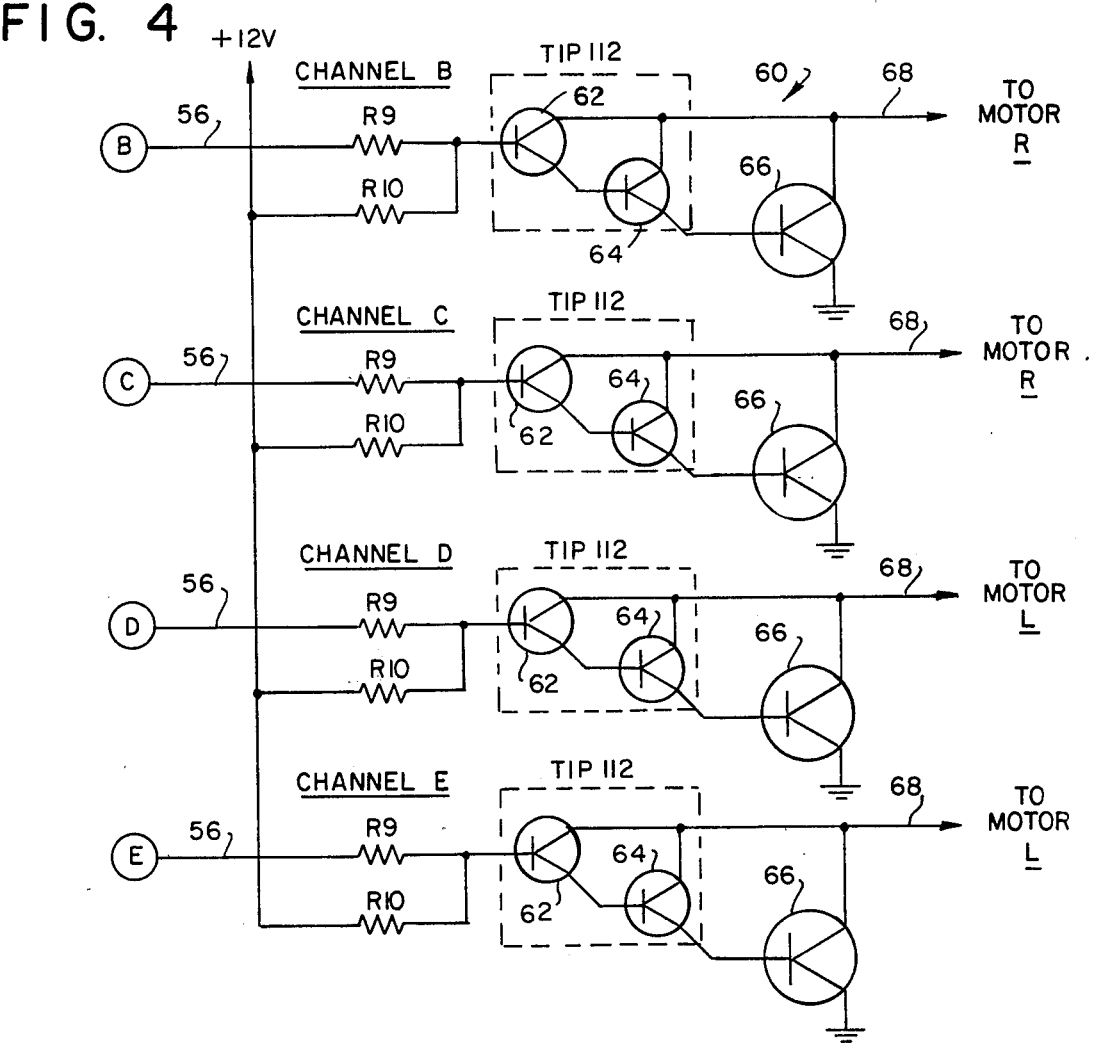
FIG. 4 is an electrical schematic diagram of the remaining portions of channels B, C, D and E of FIG. 3.

Referring to FIGS. 3 and 4, there are shown four control circuit channels B, C, D and E respectively connected to sensors RF, RR, LF and LR. The outputs of channels B and C are connected to the input terminals of Motor R which drives the right wheel 20 of wheelchair 16 and the outputs of channels D and E are connected to the input terminals of Motor L which drives the right wheel 22 of wheelchair 16. Since each of the four channels, B, C, D and E are similar in structure and operation, only channel B will be described herein. Sensor RF, like remaining sensors RR, LF and LR, comprises a metal plate or etched printed circuit board 24 having an overlying protective insulating layer 26 forming a capacitor between the metal sensing plate 24 and the operator's body, and also serves the purpose of eliminating shock and static hazard to the user. As shown in FIG. 2A, the sensor metal plate 24 senses body capacitance of the user when he touches insulating cover layer 26. It has been found that the capacitance of the human body is substantially uniform and lies in the range of 22 to 34 picofarads. Adjacent sensors, such as LF and RF, or LF and LR are interlaced so that a smooth transition in wheelchair direction and velocity is achieved when the user sweeps his hand, for example, from one sensor area to an adjacent one.

Referring to FIG. 3, in operation, assume that the user is about to apply his hand to sensor RF which detects the user's body capacity. The capacitance detected by sensor RF is coupled through a coaxial cable 32 to the input of free-running sensor oscillator U3 which poduces a square wave output 34 having a frequency of about 150 KHZ when no body capacity is applied to sensor RF such as by the application of the user's hand thereto. Oscillator U5 may typically comprise an NE-557 type timer circuit which constitutes dual NE-555 type circuits. The output frequency of oscillator U3 at output lead 28 is determined by resistors R1 and R2, and the total capacitance applied to Junction 30 comprising the sum of the capacitance of sensor RF, the capacitance coupled to sensor RF by the user's body, and the capacitance of the coaxial cable 32. The "initial" frequency, i.e., with no capacity coupled to sensor RF, of the output waveform 34 appearing on output 28 shown in FIG. 6, which is quite stable and not critical is normally 150 KHZ. The duty cycle of oscillator output waveform 34, which is set by the ratio of resistors R1 to R2 is 50% thereby providing a square waveform. It is noted, however, that a 50% duty cycle for waveform 34 is not mandatory since the circuitry following the output of oscillator U3 only detects the trailing edge 34' of waveform 34. Since the supply voltage, as indicated, is +5 volts, the output level of waveform 34 is approximately 0 to +5 volts.

Since the frequency of output waveform 34 is a function of the total capacitance applied to junction 30, the addition of the user's body capacitance coupled to sensor RF will cause the frequency of waveform 34 to decrease by an amount depending on the magnitude of the coupled capacitance and the initial frequency of waveform 34; the higher the initial frequency, the greater the frequency change for a given coupled capacity. It is understood that if the difference in initial frequency of the various channels B, C, D and E is too great to achieve substantially equal sensitivity for all channels, then the various coaxial cables 32 may be trimmed or trimmer capacitors (not shown) may be added thereto.

The output of oscillator U3, namely waveform 34 is applied to one-shot multivibrator circuit U5 which acts as a discriminator. One-shot circuit U5, which is also known as a "delay-flop" or "single pulser" may comprise standard integrated circuit ("IC") type SN74123. It is understood that other IC types, such as Nos. 9316, 74121 or 74122 may be used for one-shot circuit U5.

The duration of output waveform 36 of one-shot circuit U5 shown in FIG. 6 is fixed by resistors R3 and R4 and capacitor C1. Variable resistor R4 serves as the main channel adjustment and is set at a value so that at the initial frequency, the output at pin 13 of circuit U5 is constantly high, i.e., at about +5 volts which corresponds to a 100% duty cycle. Any decrease in the frequency output of oscillator U3 due to the body capacity coupled to sensor RF causes a corresponding decrease in the duty cycle of output waveform 36 of circuit U5 since the time duration of pulses 36 is fixed. It is noted that the waveform (not shown) appearing at output pin 4 of circuit U5 is the complement of waveform 36. As pointed out above and shown by waveforms 34 and 36 in FIG. 6 circuit U5 is triggered by the trailing edge 34' of the output from oscillator U3.

Referring to FIG. 6, it is seen that addition of the body capacitance to sensor RF, causes an increase in the pulse width of pulses 34 and reduction in the duty cycle of waveform 36. Waveforms 34 and 36 for a 50% sensed capacitance are designated by the numerals 34a and 36a and for 66% sensed capacity by the numerals 34b and 36b respectively in FIG. 6. Thus, for no coupled capacity and at the initial frequency of oscillator U3, the one-shot waveform 36 is at almost 100% duty cycle; when about one-half the sensed capacitance is applied to sensor RF, the one-shot waveform 36a duty cycle is reduced to about 66%, and when the maximum body capacitance is added to the sensor the one-shot waveform 36b duty cycle is reduced to its minimum of about 50%.

Operational amplifier (Op Amp) U7, to which one-shot waveform 36 is applied at input lead 38 and its complementary waveform at input lead 40 serves as a balanced integrator comprising a balanced amplifier and integrator, The integrator time constant which is determined by R7 and C2 is sufficiently large to integrate the one-shot pulses of waveform 36 to a D.C. level which is a function of the gain of operational amplifier U7 and the duty cycle of waveform 36. In this way, operational amplifier U7 detects the change in duty cycle of waveform 36 caused by the changes in capacitance coupled to the sensor.

Initially, the gain of Op Amp U7 may initially be set to about 3 by the ratio of R7/R5=R8/R6, however, this gain may be increased if an increase in sensitivity is found to be necessary. Due to the presence of capacitor C2, one side of Op Amp U7 is unbalanced by acting as an integrator whereby gain as well as a D.C. output level signal is produced at output lead 42.

It is noted that the +5 volt supply voltage for Op Amp U7 is single ended because the output voltage for the circuits following Op Amp U7 should be a zero volt minimum corresponding to the initial frequency of oscillator U3 and a maximum of +4 volts for maximum sensed capacitance coupled to sensor RF. The change in D.C. output voltage at integrator output lead 42, which is illustrated by line 44 in FIG. 8 rises linearly with a decrease in duty cycle of one-shot waveform 36 and thus linearly with the increase in body capacitance coupled to sensor RF.

Channel adjustment may be accomplished by selective variation of resistor R4 so that the D.C. level at lead 42 is +0.5 volts. As capacitance is added to sensor RF, the duty cycle of waveform 36 will decrease and, at the minimum design frequency of oscillator U3, the output 44 at lead 42 will be approximately +4 volts.

Figure 5:
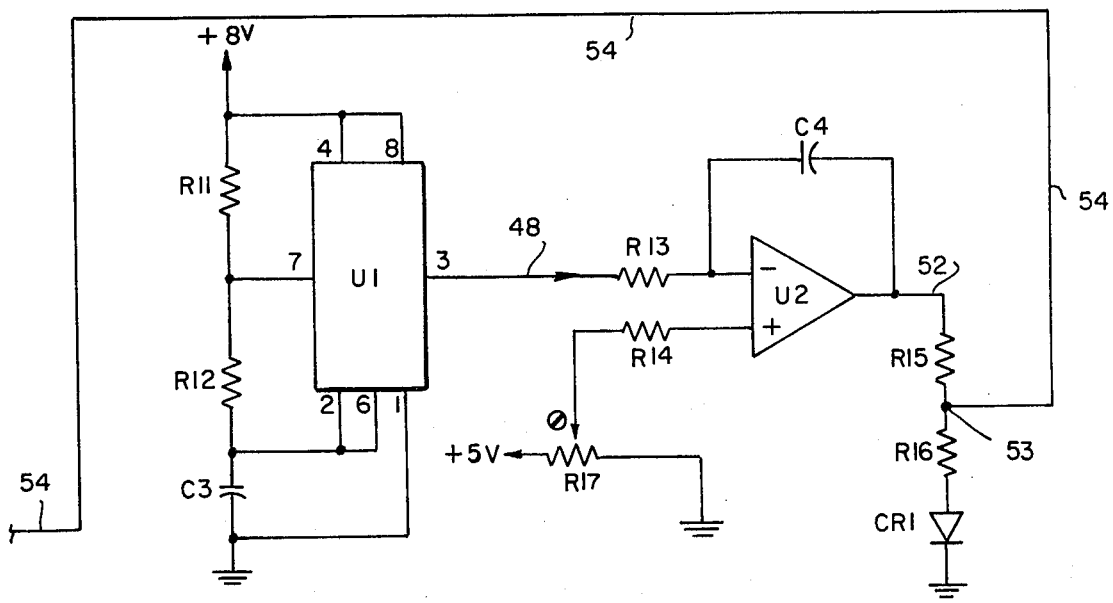
FIG. 5 is an electrical schematic diagram of the remaining portion of the electronic control system of the present invention, to be taken together with FIGS. 3 and 4 to form a complete schematic diagram of said electronic control system.
Figure 7:
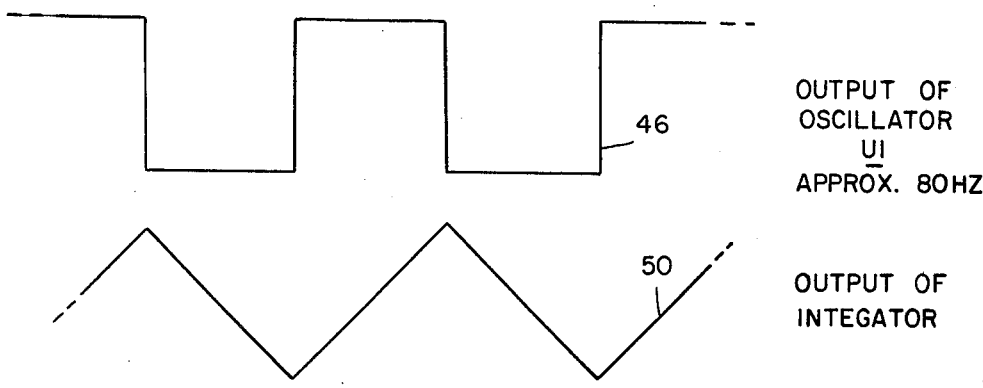
FIG. 7 is a waveform diagram showing the output waveforms of oscillator U1 and integrator U2 of FIG. 5.

Oscillator U1, which is similar to oscillator U3 except for its output frequency, shown in FIG. 5, provides a square wave output 46 at an output frequency of approximately 80 HZ and may comprise a type NE555 integrated circuit. Resistors R11, R12 and capacitor C3 determine the frequency of oscillator output waveform 46 shown in FIG. 7, while the ratio of resistors R11 to R12 determines the duty cycle thereof. Resistor R11 is chosen to have as small a resistance as possible in order to provide an almost perfect square wave 46 having a 50% duty cycle. In order to generate a signal with a sufficiently large amplitude for the circuits following, the supply voltage as shown is +8 volts D.C.

The square wave output 46 is applied via output lead 48 to integrator U2 to produce a triangular waveform 50 at output lead 52 of integrator U2. The time constant of integrator U2, which is determined by resistor R14 and capacitor C4, is chosen so as to make waveform 50 substantially triangular, with R15 selected so that the peaks of waveform 50 are not clipped either at the top or bottom thereof, the peak-to-peak voltage of waveform 50 being about 0 to +7 volts. It is noted that the +8 volt D.C. single ended supply to integrator U2 shown in FIG. 5 is required because the output of oscillator U1 is about 0 to +8 volts and the output of integrator U2 must be approximately 0 to +7 volts.

Reference triangular waveform 50 is applied to the divider network comprising resistors R15 and R16 and diode CR1 to ground to cut the amplitude of waveform 50 by about 50% and clamp its lower peaks to about 0.7 volts above ground. This triangular waveform at junction 53 is applied to the + terminals of each of comparators U4 in channels B, C, D and E via lead 54 as shown in FIG. 3.

Figure 8:
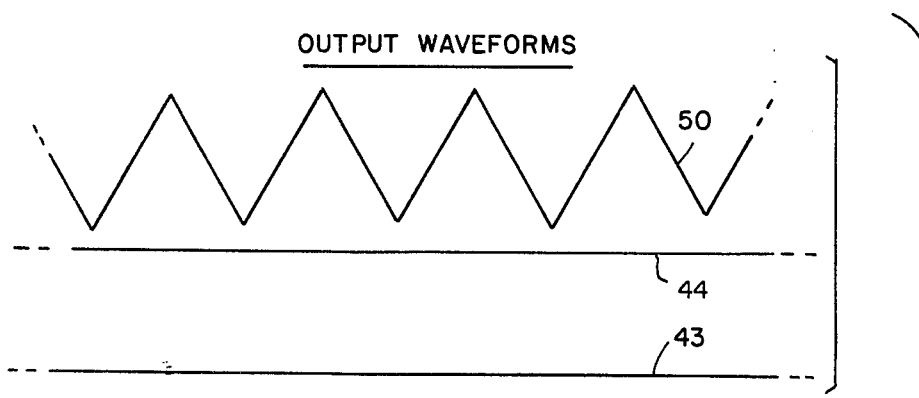
FIG. 8 is a waveform diagram showing rhe waveform outputs of comparator U4 of FIG. 3 for various input levels of the D.C. level output of integrator U7.
Figure 8:
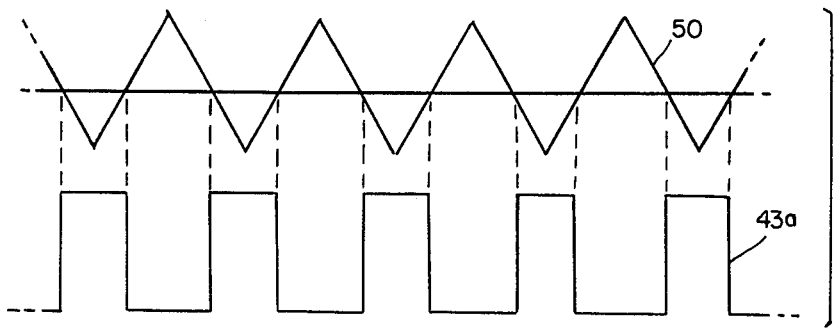
Figure 8:
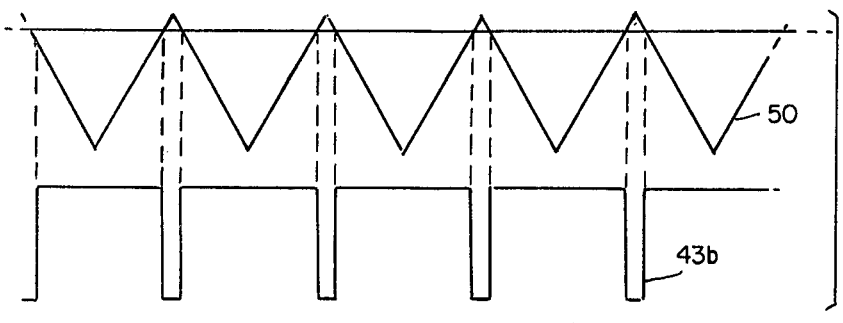

Comparator U4, which may comprise a Type LM339 integrated circuit, is operative to compare the output of balanced integrator U7 at lead 42, which is a function of the body capacitance coupled to sensor RF, with the reference triangular wave output 50 from integrator U2 on lead 54. Thus, D.C. output line 42 pulse-width modulates reference waveform 50 to thereby control the D.C. voltage at output lead 56 to be applied to D.C. wheel drive motors L and R. Thus, a higher channel voltage output on lead 42 will produce a wider pulse width of the comparator pulse output 43 on lead 56. For this reason, as indicated above, resistor R4 is adjusted to a quiescent voltage of +0.5 volts, for zero coupled capacitance on sensor RF, while the lowest point on triangular waveform 50 at junction 53 is +0.7 volts, which will produce a zero output on comparator output lead 56, as shown in FIG. 8. If the channel output 44a at lead 42 rises about +0.7 volts (due to body capacitance coupled to sensor RF), comparator U4 will produce a pulse output 43a at a constant rate of 80 HZ, as shown in FIG. 8. As the channel voltage 44b rises (due to increased coupled capacitance) the pulse width of the comparator 43b will increase, as shown in FIG. 8, for a constant frequency of 80 HZ, whereby the average power (which is directly proportional to pulse width) delivered to the motor will increase accordingly. For a channel voltage of +4.2 volts, it will exceed the magnitude of triangular waveform 50 whereby constant full power will be applied to motor R through power output circuit 60.

The supply voltage of comparator U4 is +12 volts as indicated in FIG. 4 which illustrates the power circuit 60 which serves as the driving circuit for the motors. In circuit 60, resistors R10 and R9 supply current to Darlington-connected output transistors 62, 64 and 66 which drive motor R at output lead 68. Since comparator U4 has an open collector output, R10 serves as the pull-up resistor, while resistor R9 also serves to limit comparator U4's current to a safe value and to reduce any inductive voltage spikes which may be fed back from motor R and/or power circuit 60 to the preceding circuitry.

It is understood that although the control system of the present invention has been described in connection with its use for controlling vehicles such as wheelchairs, it is to be understood that its use is not limited thereto. In addition to its application for use in other vehicles such as electric golf carts, the control system of the present invention may be employed in industrial applications, such as the control of mechanical arms in nuclear applications, electric and electro-hydraulic units such as cranes. Moreover, since the sensing areas are made of printed circuit materials, they can be etched to produce responses other than linear, such as logarithmic, or virtually any other desired response function, a feature which is particularly valuable in servo-feedback applications.

While preferred embodiments of the invention have been shown and described herein it is obvious that numerous omissions, changes and additions may be made in such embodiments without departing from the spirit and scope of the invention.

What is claimed is:

1. An electronic control system for controlling the operation of electromotive means, comprising:
   electronically capacitive sensing means for detecting proximity thereto by a portion of a human body,
   oscillator means responsive to said sensing means operative to produce a series of output pulses having a frequency in accordance with the capacitance input thereto by said sensing means,
   discriminator means for detecting the trailing edges of said oscillator pulses and producing a series of fixed width pulses in response thereto,
   integrator means operative to produce a D.C. voltage in accordance with said discriminator pulses, said D.C. integrator voltage corresponding to the magnitude of the coupled capacitance sensed by said capacitance sensing means.

2. An electronic control system as defined in claim 1 further comprising reference waveform generating means for producing a triangular reference waveform,
   comparator means operative to compare said integrator D.C. voltage and said triangular reference waveform and to produce a series of rectangular pulses having a duty cycle determined by the difference between said compared D.C. voltage and said triangular waveform, and
   power circuit means for applying said pulsed D.C. output to said electromotive means.

3. An electronic control system as defined in claim 1 wherein said oscillator means output pulses comprises a changeable rectangular waveform, the frequency of which changes with the amount of capacity sensed.

4. An electronic control system as defined in claim 3 wherein said discriminator means comprises a one-shot delay flop circuit operative to produce a series of rectangular pulses of fixed pulse width whose leading edges are respectively time coincident with the trailing edges of said oscillator means output pulses.

5. An electronic control system as defined in claim 4 wherein said integrator means is operative to produce a D.C. voltage signal corresponding to the discriminator output which voltage signal corresponds to the amount of capacity sensed.

6. An electronic control system as defined in claim 5 wherein said reference waveform generating means comprises reference oscillator means operative to produce a series of rectangular pulses having a fixed pulse frequency and reference integrator means operative to produce a series of triangular pulses having a frequency equal to said reference oscillator rectangular pulses.

7. An electronic control system as defined in claim 6 wherein said comparator means is operative to produce a zero output when said integrator D.C. voltage is less than the inverse peak voltage of said reference integrator triangular pulses.

8. An electronic control system as defined in claim 7 wherein said comparator means output pulses have a substantially one hundred percent duty cycle when said integrator voltage exceeds the peak voltage of said reference integrator triangular pulses.

9. An electronic control system as defined in claim 8 wherein the duty cycle of said comparator output pulses is linearly dependent on the level of said D.C. integrator voltage.

10. An electronic contol system as defined in claim 9 including power circuit means having an input terminal for the application thereto of said comparator output pulses and an output terminal for connection to said electromotive means.

11. An electronic control system as defined in claim 1 wherein the capacitative output signal produced by said sensing means varies in accordance with the area of the said human body proximity.

12. An electronic control system as defined in claim 11 wherein said sensing means comprises a plurality of sensing areas, each of said sensing areas representing corresponding directional command signals for said electromotive means.

13. An electronic control system as defined in claim 12 wherein each of said sensing areas has associated therewith a channel comprising said oscillator means, said discriminator means, said integrator means, said reference waveform generating means, said comparator means, said power circuit means and a motor.

14. An electronic control system as defined in claim 13 wherein said electromotive means comprises four sensing areas representing forward and reverse direction drive for each of said motors.

* * * * *